No. 853,725. PATENTED MAY 14, 1907.
C. L. NEWTON.
NUTMEG CONTAINER AND GRATER.
APPLICATION FILED NOV. 17, 1906.
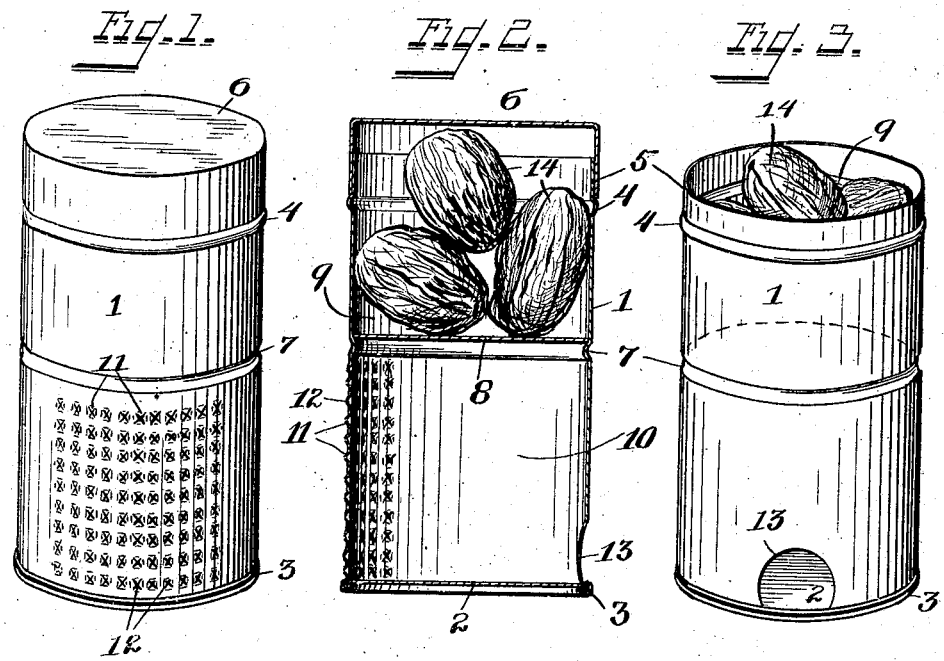
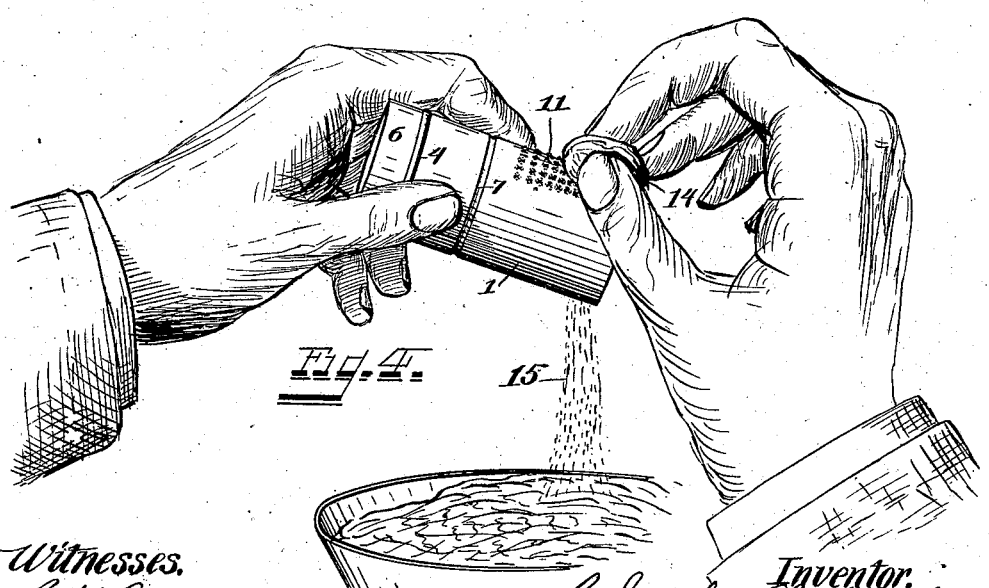
Witnesses.
C. W. Earnist.
Ada Burnett
Inventor.
Charles L. Newton
By James N. Ramsey
Attorney.

UNITED STATES PATENT OFFICE.

CHARLES L. NEWTON, OF CINCINNATI, OHIO.

NUTMEG CONTAINER AND GRATER.

No. 853,725.  Specification of Letters Patent.  Patented May 14, 1907.

Application filed November 17, 1906. Serial No. 343,874.

*To all whom it may concern:*

Be it known that I, CHARLES L. NEWTON, a citizen of the United States, residing at Cincinnati, in the county of Hamilton and State of Ohio, have invented certain new and useful Improvements in Nutmeg Containers and Graters, of which the following is a specification.

My invention relates to utensils for containing and grating nutmegs, the object being to provide a container as nearly as possible resembling an ordinary can for the purpose of marketing the nutmegs as well as to serve as a grater for the use of the consumer who purchases them.

My invention consists in a cylindrical can provided with a lid in the usual manner with an annular inwardly extending bead between the lid and the bottom of said can, a perforated grating surface on the convex side of said can and an oppositely disposed opening near the bottom of said can, as will be hereinafter more fully described.

In the drawings which serve to illustrate my invention: Figure 1 is a perspective view of the device. Fig. 2 is a vertical section. Fig. 3 is a perspective view with the lid removed and showing the side opposite to that shown in Fig. 1. Fig. 4 is a perspective view showing the manner of using the device.

The construction of my improved nutmeg container and grater is as follows: The device is provided with a can 1 having a bottom 2 secured thereto by means of a flanged joint 3. An outwardly extending circular rib 4 comprising a corrugation near one end of the cylinder is adapted to engage flange 5 of detachable lid 6 and form a stop and gage therefor. It also serves as a seat for the sharp edge of flange 5 and to furnish a smoother exterior when the lid is on as well as to provide a catch for the hand by which to hold it as shown in Fig. 4. Near the middle of the can an inwardly extending annular bead 7 comprising a corrugation is provided to receive and support a removable partition 8 which is adapted to form the bottom of the nutmeg container 9 and separate it from the nutmeg grating chamber 10. One side wall of the chamber 10 is provided with outwardly extending projections 11 to form a grating surface and has in connection therewith perforations 12 to admit the gratings into the grating chamber in which they are collected. An opening 13 is provided in the opposite convex side of the can 1 for the purpose of discharging the nutmeg gratings as needed.

My improved nutmeg container and grater, being substantially a cylindrical can provided with a bottom and a lid in the usual manner and having as its only openings the perforations 12 in the grating surface and the opening 13 near the bottom, is adapted to form a container having the appearance of the usual cans used for vending spices and other groceries, while, when in use, my improved device forms a container adapted to be self supported in upright position upon a horizontal base.

It will be seen that in using this device it is only necessary to remove the lid 6 which gives access to the nutmeg after which a nutmeg taken from the receptacle, formed above the removable partition 8, may be grated as usual on the grating surface, the gratings falling into the chamber 10 where they will remain until discharged through the opening 13. It will thus be seen that the chamber 10 is adapted to contain any excess of gratings which may be produced at one time, saving them and thus permitting economy in the use of nutmegs. The partition 8 may be permanently secured in position although I prefer to insert it loosely as shown and described.

I claim:

As an article of manufacture, a combined nutmeg container and grater comprising a cylindrical can provided with a perforated grating surface upon the convex side of said can at the lower portion thereof, and provided with a bottom and a lateral discharge opening near said bottom, a lid thereon, an inwardly extending annular bead thereon near the middle thereof and above the grating surface, and a partition supported by said bead and forming a cylindrical shaped nutmeg container thereabove.

CHARLES L. NEWTON.

Witnesses:
JAMES N. RAMSEY,
ADA BURNETT.